United States Patent [19]

D'Antonio et al.

[11] 4,395,759

[45] Jul. 26, 1983

[54] ELECTRONIC SAFETY SKI BINDING WITH REDUNDANT SENSORS

[75] Inventors: Nicholas F. D'Antonio, Luverpool, N.Y.; Walter Knabel, Farchant, Fed. Rep. of Germany

[73] Assignee: Marker-Patentverwertungsgesellschaft GmbH, Switzerland

[21] Appl. No.: 160,926

[22] Filed: Jun. 19, 1980

[30] Foreign Application Priority Data

Jun. 22, 1979 [DE] Fed. Rep. of Germany ....... 2925375

[51] Int. Cl.³ ............................................... A63C 9/08
[52] U.S. Cl. ..................................... 364/410; 280/612
[58] Field of Search ................. 280/612, 613; 364/410

[56] References Cited

U.S. PATENT DOCUMENTS

| | | |
|---|---|---|
| 3,907,316 | 9/1975 | Marker et al. |
| 4,130,296 | 12/1978 | D'Antonio et al. ................. 280/612 |
| 4,156,534 | 5/1979 | Salomon .............................. 280/612 |
| 4,160,555 | 7/1979 | Salomon .............................. 280/612 |
| 4,280,714 | 7/1981 | Salomon ......................... 280/612 X |

FOREIGN PATENT DOCUMENTS

| | | |
|---|---|---|
| 2244949 | 3/1974 | Fed. Rep. of Germany . |
| 2519544 | 11/1975 | Fed. Rep. of Germany . |
| 1514492 | 6/1978 | United Kingdom . |

*Primary Examiner*—Edward J. Wise
*Attorney, Agent, or Firm*—Squire, Sanders & Dempsey

[57] ABSTRACT

An electronic safety ski binding comprises force sensors for generating electric signals in response to forces and/or torques acting on the skier's leg, and an electronic integrated circuit for processing the electrical signals and initiating the operation of the releasing mechanism of the binding by the generation of a triggering signal generated in response to the detection of the sensors of forces or torques which may endanger the safety of the skier. At least two force sensors are provided, as redundant protection against sensor failure for sensing one of the loads (forces and torques) which typically act on a skier's leg. Each of the two sensors is independently capable of detecting the same load so that the electronic circuit can generate, in response to the detection of a load which may endanger the skier, a triggering signal which initiates the operation of the releasing mechanism of the binding.

8 Claims, 6 Drawing Figures

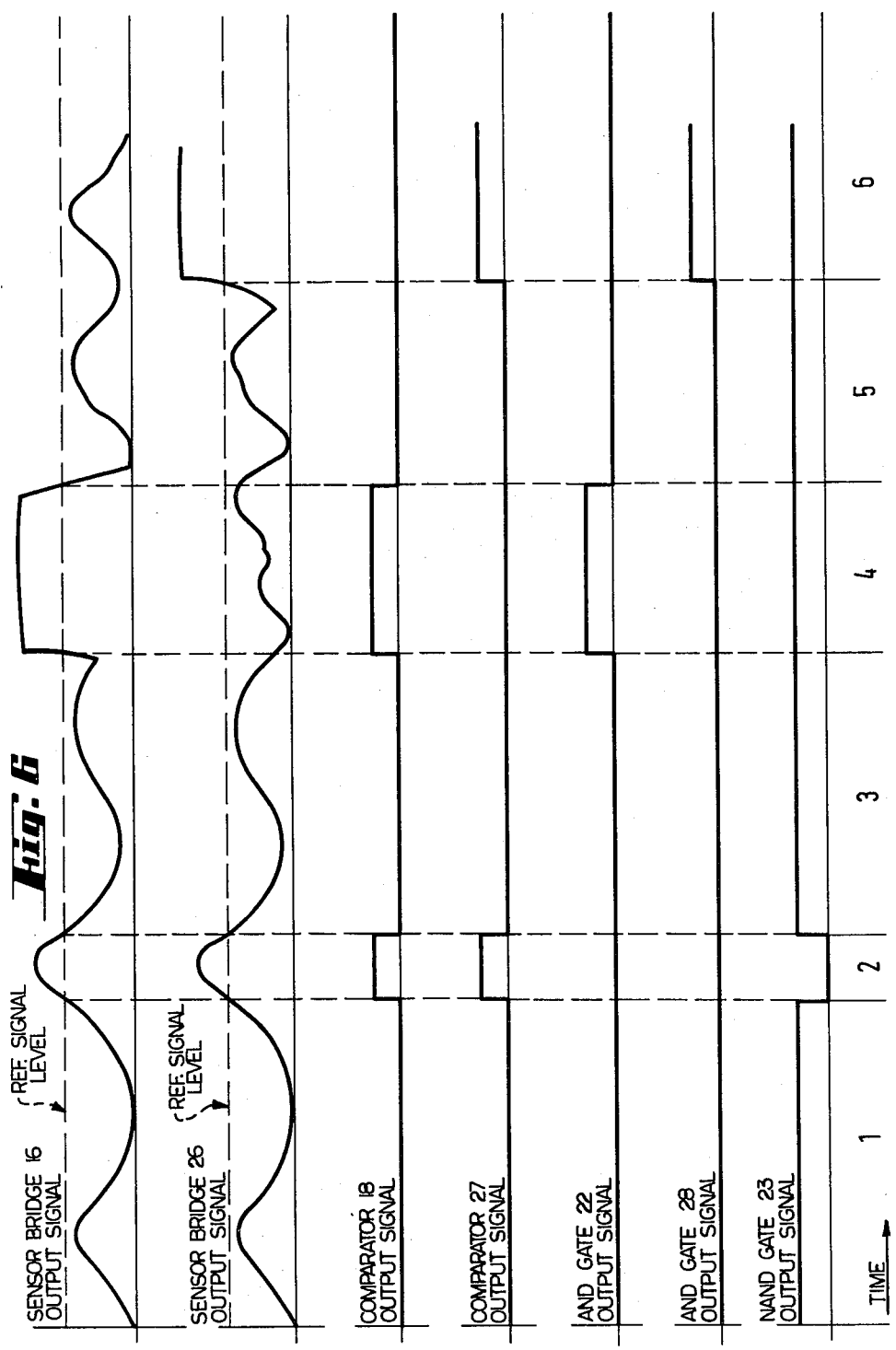

ELECTRONIC SAFETY SKI BINDING WITH REDUNDANT SENSORS

This invention relates to an electronic safety ski binding. A ski binding is used to attach a ski to a skier's boot. It has a latching condition in which the boot is firmly grapsed by the binding, and a releasing condition in which the grasp is released so that the boot may be separated from the ski. An electronic safety ski binding includes force sensors for generating electric signals in response to forces and/or torques acting on the leg of a skier using the binding. The binding further includes an electronic integrated circuit for processing of the electrical signals and for initiating the operation of the releasing mechanism of the binding by the generation of a triggering signal in response to the detection of forces or torques which may endanger the safety of the skier.

BACKGROUND AND SUMMARY OF THE INVENTION

Electronic safety ski bindings are known, e.g., see U.S. Pat. Nos. 3,907,316 and 4,291,894, having having force sensors for sensing each of the forces and torques which can typically act on the skier's leg during skiing. If a single snesor were used to detect each load the electronic safety ski bindings would be unusable when any one of the force sensors were defective or inoperative so that one of the loads could not be detected.

For this reason it is an object of the present invention to provide an electronic safety ski binding which is more reliable because its operative condition cannot be adversely affected by a failure of only individual force sensors.

In a safety ski binding of the kind described first hereinbefore this object is accomplished according to the invention by providing at least two force sensors for sensing each of the loads (forces and torques) which typically act on the leg, of a skier using the binding. Each of the two sensors is independently capable of detecting the same load so that the electronic circuit can generate, in response to the detection of a a load which may endanger the skier, a triggering signal which initiates the operation of the releasing mechanism of the binding. The reliability of the safety ski binding according to the invention is therefore considerably increased since each load can be detected even when one of the individual force sensors for each load is inoperative.

An electronic safety ski binding may also become unusable if a force sensor generates erroneous electrical signals because it is inoperative.

The reliability of an electronic safety ski binding can be further increased by eliminating erroneous signals generated by inoperative sensors. In accordance with a development of the invention, a comparator circuit is associated with each force sensor which compares the electrical signal generated by a sensor with an improbably high reference signal level and eliminates from further processing any signal which reaches the reference values as an erroneous signal. In such an embodiment, a release can be initiated only by sensor signals indicating loads in excess of the permissible forces but within reasonable ranges, or when both of the sensor pair detect an excessive load simultaneously. The latter condition would indicate a normal, highly aggressive, but short duration, load.

It should be noted that normally a bridge containing a defective sensor will generate a saturation level signal in one direction or the other.

BRIEF DESCRIPTION OF THE DRAWINGS

An embodiment of the invention will now be explained more fully with reference to the drawings, in which

FIG. 6 is a graphical description of system operation.

DETAILED DESCRIPTION OF PREFERRED EMBODIMENT

Figure 1:
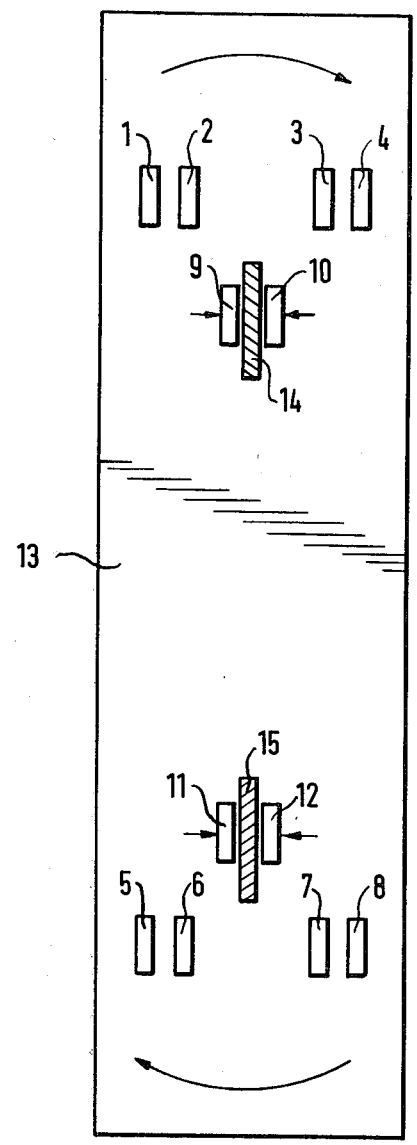
FIG. 1 is a diagrammatic view showing a sole-plate of an electric safety ski binding with an indication of the regions in which the force sensors are disposed.

In FIG. 1, a schematic, plan view of a portion of an electronic safety ski binding showing the relative placement of the force sensors is depicted.

A sole plate 13 shown in FIG. 1 is secured by means of a fixing plate, not shown, to a ski by known means, not shown. At each of the portions of sole plate 13 adjacent to the ball and heel portions of a skiing boot when it is inserted in the binding, sole plate 13 is provided with four force sensors, 1 to 4 at one boot portion and sensors 5 to 8, at the other. These sensors detect compressive and tensile forces. Torque-sensing force sensors 9 and 10 at one boot portion bear against an intermediately located stop 14 and torque-sensing sensors 11 and 12 bear against an intermediately located stop 15. Stops 14 and 15 are fixed to sole plate 13 and thereby to the ski.

Force sensors 1 to 8 sense forces perpendicular to sole plate 13. Force sensors 9 to 12 are torque sensors and sense torques, i.e., forces parallel to sole plate 13.

Each of the force sensors for sensing forces and torques stands alone until electrically connected in known manner to form a bridge circuit.

The force sensors of the embodiment which is described here by way of example are of a type which in response to the stresses caused by the forces vary their electric resistance approximately in proportion to the applied force. Force sensors having a different mode of operation could alternatively be used. The force sensors are preferably connected in bridge circuits. When no forces are present, the bridges are balanced, i.e. have no output signal. When the force sensors connected in bridge circuits are subjected to stresses depending on the forces applied, the resistances of the force sensors will be changed so that a previously balanced bridge becomes unbalanced and delivers an output voltage which represents the tension or compression that is being sensed by the force sensors. The bridge circuits are not described here in more detail because they are known.

Figure 2:
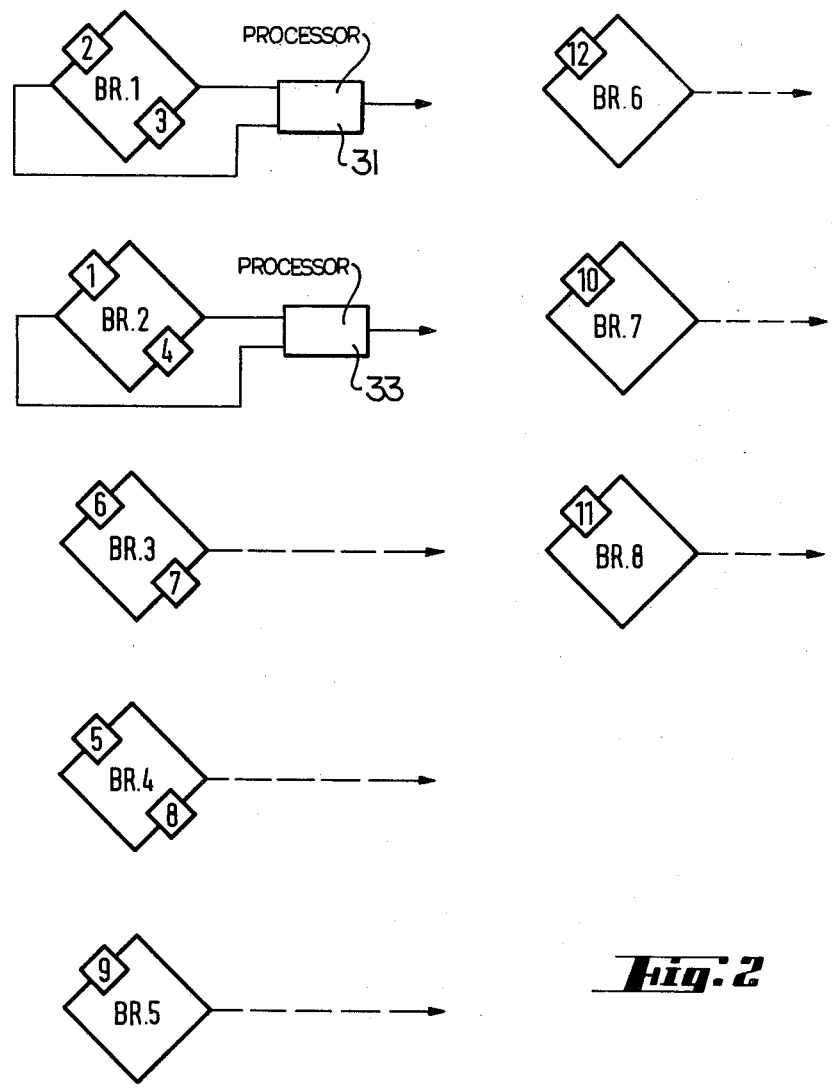
FIG. 2 shows the connection of the force sensors to provide pairs in measuring bridge circuits for sensing tensile and compressive forces and torques.

In FIG. 2, eight bridge circuits are shown schematically, with each circuit designated as "BR" plus an identifying number. The output terminals of bridges 1 and 2 are shown connected to separate, respresentative electronic signal processing circuits 31 and 33 for processing the bridge output signals. It is understood that each bridge is connected to a processing circuit in order that the output signal of each bridge may be interpreted. Each bridge contains one or two of the sensors as shown in FIG. 1.

In FIG. 2, the several bridge circuits serve to sense the following forces and torques:

BR.1 senses a first front force,
BR.2 senses a second front force,
BR.3 senses a first rear force,
BR.4 senses a second rear force,
BR.5 senses a first right-hand torque,
BR.6 senses a second right-hand torque,
BR.7 senses a first left-hand torque,
BR.8 senses a second left-hand torque, A redundant safety precaution against a failure of a measuring bridge circuit is provided in that there are two bridge circuits present to detect each of the acting forces and torques. A release of the binding will be initiated when any of the bridge output signals which are processed in the succeeding electronic circuit exceeds the critical threshold values for magnitude and time.

Figure 3:
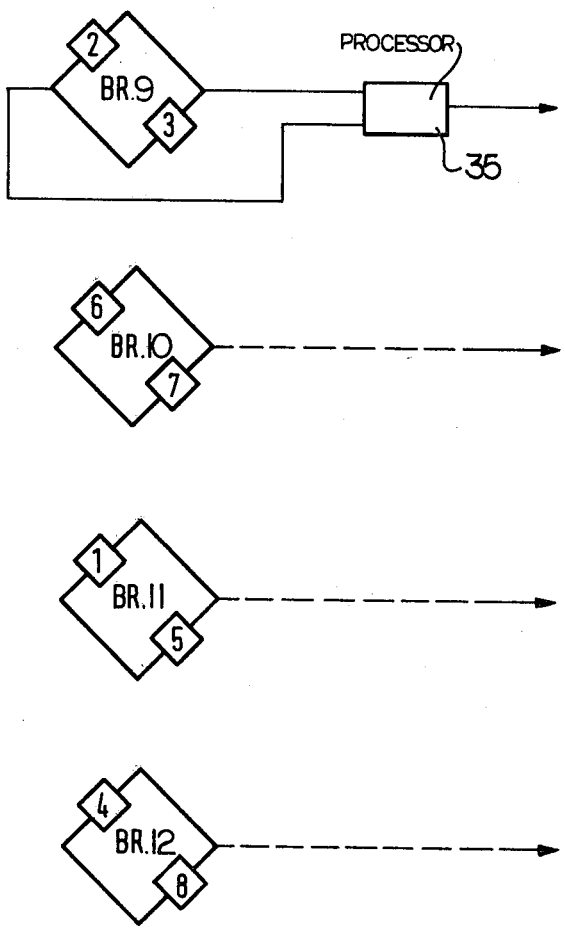
FIG. 3 shows the connection of the force sensors in measuring bridge circuits for sensing front and rear forces and forces resulting from a tilting to the left or right.

In FIG. 3, four different bridge circuits, BR 9 through BR 12 are shown. This arrangement lacks the redundancy feature of the invention embodied in the bridge arrangement of FIG. 2 and does not use sensors 9 through 12. These bridge arrangements do permit detection of tilting, i.e. roll forces, as well as forces perpendicular to the ski. The output terminals of bridge BR 9 is shown connected to a representative signal processing circuit 35 and, again, it is understood that in operation each bridge is connected to such a circuit. Specifically, bridge circuit BR.9 detects front forces or a tilting to the rear,
BR.10 detects rearward forces or a forward tilting,
BR.11 detects a tilting to the left and
BR.12 detects a tilting to the right.

Figure 4:
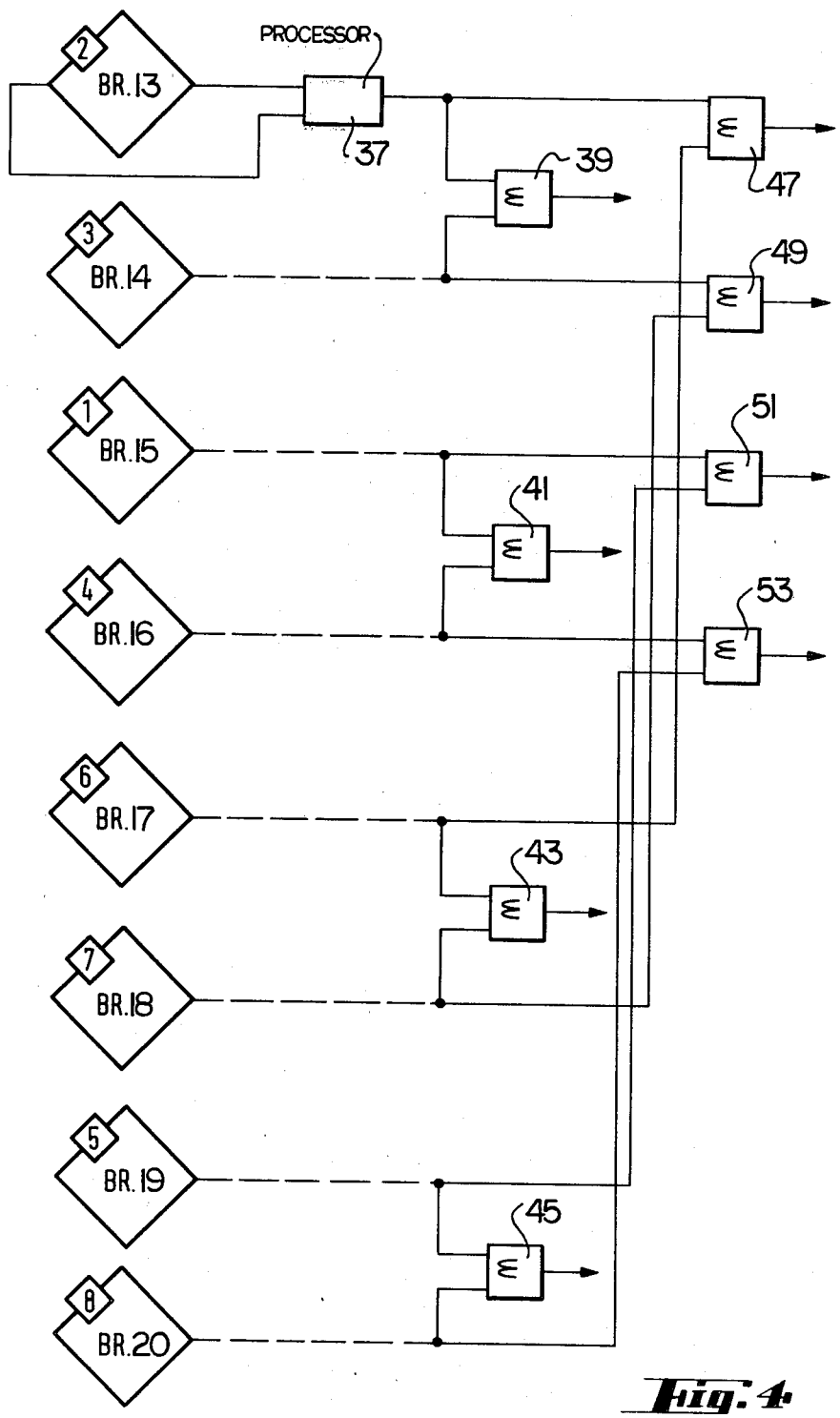
FIG. 4 shows the connection of the force sensors to provide pairs in the measuring bridge circuits for sensing forces, torques forces tilting

In FIG. 4, an arrangement of bridges, BR 13 through BR 20, is shown along with summing means 39 through 53. Bridge BR 13 is shown connected to a representative signal processing circuitry 37 and it is understood that in operation each bridge is connected to a similar processing circuit. Each of bridges BR 13 through BR 20 incorporates one of the sensors of FIG. 2. Each summing means 39 through 53 algebraically sums the output signals fed to it. The bridge arrangement of FIG. 4 permits detection of both the forces perpendicular to the ski and the roll or tilt forces with redundancy to protect against defective sensors. Again, whenever a properly functioning sensor detects a force exceeding the maximum safe level for a skier, it can initiate the generation of a triggering signal commanding the binding to release.

The several bridge circuits in FIG. 4 serve to sense the following forces:

BR.13 and BR.14 together sense a first front force, the sum of the signals corresponding to the detected first front force appearing at the output of summing means 39;

BR.15 and BR.16 together sense a second front force, the sum of the signals corresponding to the detected second front force appearing at the output of summing means 41;

BR.17 and BR.18 together sense a first rear force, the sum of the signals corresponding to the detected first rear force appearing at the output of summing means 43;

BR.19 and BR.20 together senses a second rear force, the sum of the signals corresponding to the detected second rear force appearing at the output of summing means 45;

BR.13 and BR.17 together sense a first force occurring during a tilting to the left, the sum of the signals corresponding to the detected first left tilting force appearing at the output of summing means 47;

BR.14 and BR.18 together sense a first force occurring during a tilting to the right, the sum of the signals corresponding to the detected first right tilting force appearing at the output of summing means 49;

BR.15 and BR.19 together sense a second force occurring during a tilting to the left, the sum of the signals corresponding to the detected second left tilting force appearing at the output of summing means 51;

BR.16 and BR.20 together sense a second force occurring during a tilting to the right, the sum of the signals corresponding to the detected second right tilting force appearing at the output of summing means 53.

Figure 5:
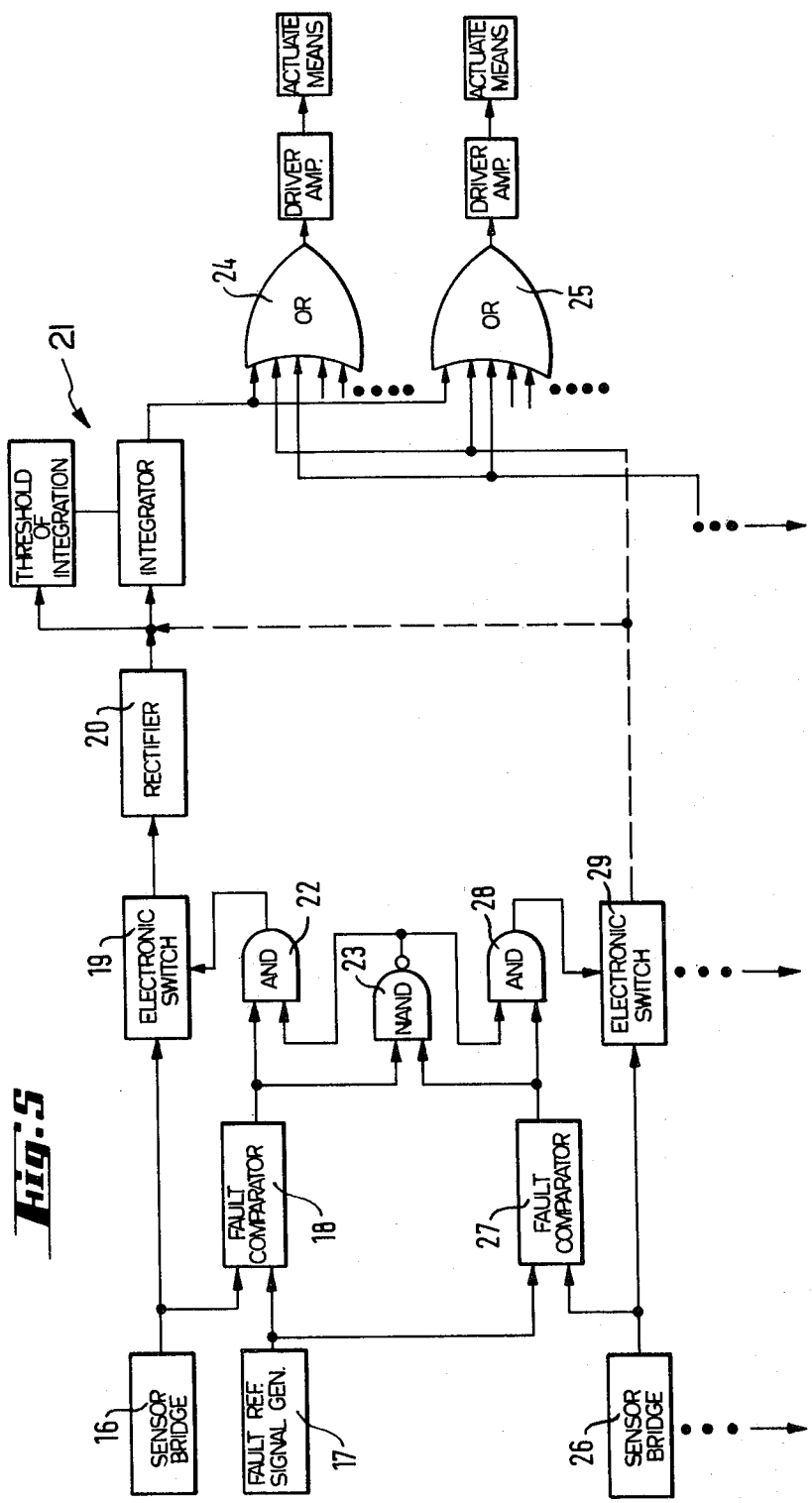
FIG. 5 is a block circuit diagram showing a means for detecting and eliminating from processing signals generated by measuring bridges including defective sensors.

FIG. 5 is a schematic representation of circuitry for processing the sensor bridge signals which advantageously employs the redundant bridge elements. In FIG. 5, the output of a sensor bridge is applied to a normally closed electronic switch 19 and to one input of a fault comparator 18. A fault reference signal generator 17 supplies a reference signal to a second input terminal of comparator 18 and to an input terminal of a second fault comparator 27. The other input terminal of comparator 27 receives the output signal of a sensor bridge 26. That output signal of bridge 26 is also applied to a second normally closed electronic switch 29. Sensor bridges 16 and 26 measure the same force or torque, i.e., are redundant in function. It is understood that the circuitry of FIG. 5 is exemplary of similar circuitry for each redundantly sensed force or torque.

The output signals of fault comparators 18 and 27 are applied to separate input terminals of a NAND gate 23. The output from comparator 18 is connected to one input terminal of an AND gate 22 which receives at another input terminal the output signal of NAND gate 23. The output signal of AND gate 22 is applied to and controls the state of switch 19. The output of comparator 27 is applied to an input terminal of an AND gate 28 which receives at another input terminal the output signal of NAND gate 23. The output signal of AND gate 28 is applied to and controls the state of switch 29.

The redundant bridge signals transmitted by switch 19 and/or by switch 29 are further processed before a triggering signal may be generated. By way of example, the output signal of switch 19 is rectified by a rectifier 20 and then integrated by an integrator 21 incorporating a threshold means for determining when forces exceeding levels safe for the skier have been detected. The integrated signal indicating dangerous force levels is applied to an OR gate 24, along with other integrated sensed force and torque signals, for operation of drivers which generate the triggering signal that commands the binding mechanism to release.

From the block circuit diagram from FIG. 5 it is apparent how each sensed force is compared with an error signal having an improbably high level and only the signals in a reasonable range are processed in the succeeding electronic circuit and initiate a release when the critical threshold value is exceeded. The circuit will be explained only with reference to the first front force pair 16, 26). That explanation is analogously applicable to all other forces and torques which are sensed with the circuits shown in FIGS. 2 and 4.

Fault reference signal generator 17 generates an error or reference signal which exceeds in amplitude virtually all probable signal levels which may be generated by sensor bridges 16 and 26 in response to applied forces.

In comparator circuit 18, the first sensed forward force single generated by sensor bridge 16 is compared with the improbably high error signal level generated by reference generator 17. If the comparison indicates the force signal from bridge 16 lies within a reasonable range, i.e., is smaller than the reference signal, then the output signal of comparator 18 will be in its low state. Likewise, the output signal of AND gate 22 will remain low and switch 19 will remain in its normally closed position. As a result, the force signal will be applied via electronic switch 19 and rectifier 20 to integrating circuit 21.

If the output signal of comparator circuit 18 switches to its high state then bridge circuit 16 is providing an input signals exceeding the reference signal indicating a defective sensor or the detection of an unreasonably large force. In that event switch 19 is opened. The high level output signal of comparator 18 is applied to AND gate 22 and NAND gate 23. As is conventional, so long as only one high level signal is applied to the input terminals of NAND gate 23, its output is at a high level, so that the second input of AND gate 22 also receives a high level signal. Thus, in this circumstance, the output signal of AND gate 22 is high causing switch 19 to open. As a result, the measured signal, which has been recognized to be wrong is not processed in the succeeding electronic circuit.

As soon as forces which are dangerous for the skier's leg have been detected by integrating circuits 21, the latter generate signals which cause a triggering signal to be applied via the OR gates to the releasing mechanism.

When both comparators 18 and 27 associated with force sensor bridges 16 and 26 for sensing the same force or torque have high level output signals indicating that the force or torque values measured by the associated bridge circuits 16 and 26 are unreasonably high, this is considered as a normal, highly aggressive force condition. In this event, the input signals to each of AND gates 22 and 28 from comparators 18 and 27 are in their high state. Those same high level signals are applied to the input terminals of NAND gate 23, which responds by producing a low level output signal. This low level signal is applied to an input terminal of AND gates 22 and 28 and, consequently, their output signals remains low. In response, electronic switches 19 and 29 will remain in their normally closed condition so that integrator 21 will continue to process the force signals in the event that the magnitude and time characteristics warrant the generation of a release command, i.e., a triggering signal. Thus, the invention provides a safety precaution through the redundancy of the sensor bridges. If one of the redundant sensor bridges fails or is defective so as to produce a saturation output signal as a result, the sensed force output signal from that bridge will be ignored and not further processed, unless a threatening force or torque is detected by the other sensor. Actually sensed large forces which produce saturation level output signals from one or both of the redundant sensor bridges are not ignored, but rather are further processed. Of course, if both sensors fail so as to produce saturation output signals, a triggering signal is generated to command a binding release.

FIG. 6 is a graphical description of system operation; six times intervals are shown to illustrate the various combinations of the two redundant sensor bridges that are being monotored by the failure detection network.

Interval 1 Both bridges 16 and 26 are producing force signals below the error region defined by the amplitude of the output signal of 17, signal generator. Therefore both comparator 18 and 27 output signals are low, and the output signals of both AND gate 22 and 28 are low. As a result, switches 19 and 29 remain closed (the switches shown have inverted logic) and integrator 21 is responding to the force signals in a normal way.

Interval 2 Both sensor bridges 16 and 18 detect an abnormally high force signal simultaneously and the signals exceed the error reference established by generator 17. Both comparator output signals go high causing the output signal of NAND gate 23 to go low. Therefore both AND gate output signals remain low and switches 19 and 29 remain closed for normal processing by integrator 21.

Interval 3 Repeat of the operating region of interval 1.

Interval 4 The output signal of sensor bridge 16 exceeds the error level defined by generator 17, but the output signal of sensor bridge 26 does not. The output signal of comparator 18 goes high but the output signal of comparator 27 does not. NAND gate 23 receives one high and one low input, signal therefore its output signal remains high. AND gate 22 receives two high inputs, therefore its output signal goes high and switch 19 opens to remove sensor bridge 16 from the processing path. AND gate 28 receives one high and one low input, therefore produces a low output. Therefore switch 29 remains closed and the sensed force signal from bridge 26 is processed by the integrator if necessary.

Interval 5 Repeat of operating regions 1 and 3.

Interval 6 The output signal of sensor bridge 26 exceeds the error reference and the output signal of comparator 27 goes high. The output signal of AND gate 28 goes high and switch 29 opens to remove the defective bridge from the processing path. The output signals of comparator 18 and AND gate 22 remain low and switch 19 remains closed and the system will respond to the "good" signal of force bridge 16.

It is noted that normal logic for switch closure (high input) in FIG. 6 can be achieved by replacing the two AND gates with OR gates and the NAND gate with a NOR gate.

What is claimed is:

1. An electronic safety ski binding having a latching condition for grasping a skier's boot in the binding and a releasing condition for releasing the boot from the binding comprising:
    at least two sensing means for redundantly detecting loads acting in a particular direction on the binding and generating electrical signals in response to said loads; and electronic circuitry operatively connected to said sensing means for receiving and processing said signals and generating a triggering signal to switch the binding from its latching condition to its releasing condition in response to the detection of a load of a predetermined value by at least one of said sensing means, wherein said triggering signal is generated when at least one of said at least two sensing means is operative and a load of the predetermined value is detected.

2. The invention according to claim 1 further including:
reference signal generator means for generating a reference signal having a predetermined value;
comparison means, receiving an electrical signal generated by said sensing means, and said reference signal, for generating a comparison signal indicative of which of said received electrical signal and said reference signal has a greater value; and
switch means operatively connected to said comparison means for transmitting said received electrical signal to said electronic circuitry in response to the indication of said comparison signal.

3. The invention of claim 2 wherein said switch means transmits said electrical signal when the value of said received electrical signal is less than the value of said reference signal.

4. The invention according to claim 1 further including:
reference signal generator means electrically connected to each of said sensing means for generating reference signals having predetermined values;
comparison means respectively receiving a reference signal and an electrical signal generated by said sensing means, for generating comparison signals indicative of the value of the respective received electrical signals relative to the respective reference signals;
switch means operatively connected to said comparison means and actuable to transmit one of said electrical signals; and
actuating means for actuating said switch means only when the value of the received electrical signals generated by at least two of said sensing means bears a predetermined relation to the value of the respective reference signals.

5. The invention according to claim 4 wherein said predetermined relation is that the value of the electrical signals generated by at least two of said sensing means is more than the value of said reference signal.

6. The invention according to claim 1 further includes:
reference signal generator means electrically connected to each of said sensing means for generating reference signals having predetermined values;
comparison means respectively receiving a reference signal and an electrical signal generated by said sensing means, for generating comparison signals indicative of the value of the respective received electrical signals relative to the respective reference signals;
switch means operatively connected to said comparison means and actuable to transmit one of said electrical signals; and
actuating means for actuating said switch means only when the value of the electrical signals generated by each of said sensing means bears a predetermined relation to the value of the respective reference signals.

7. The invention according to claim 6 wherein said predetermined relation is that the value of all of said received electrical signals is more than the value of said reference signal.

8. The invention of claims 2, 4 or 6 wherein the value of said reference signal is predetermined according to the maximum probable value of said electrical signals generated by said sensing means when said sensing means is functioning properly.

* * * * *